US005562467A

United States Patent [19]
Davis, II et al.

[11] Patent Number: 5,562,467
[45] Date of Patent: Oct. 8, 1996

[54] ELECTRICAL INTERFACE SEAL

[75] Inventors: James T. Davis, II; Benjamin J. Hafen, both of Sunrise; Julio A. Abdala, Ft. Lauderdale; Steven J. Finch; Brock J. Langan, both of Plantation, all of Fla.

[73] Assignee: Motorola, Inc., Schaumburg, Ill.

[21] Appl. No.: 517,006

[22] Filed: Aug. 18, 1995

Related U.S. Application Data

[63] Continuation of Ser. No. 157,495, Nov. 26, 1993, abandoned.

[51] Int. Cl.⁶ .................................................. H01R 29/00
[52] U.S. Cl. .................................... 439/188; 200/51.09
[58] Field of Search ................................ 439/188, 489;
200/51.09

[56] References Cited

U.S. PATENT DOCUMENTS

| | | | |
|---|---|---|---|
| 2,184,359 | 12/1939 | Mueller | 200/51.09 |
| 3,599,167 | 8/1971 | Adrian | 200/51.09 |
| 3,843,854 | 10/1974 | Mori | 200/51.09 |
| 4,148,536 | 4/1979 | Petropoulsos | 439/188 |
| 4,714,439 | 12/1987 | Marabotto | 439/627 |
| 4,874,325 | 10/1989 | Bensing et al. | |
| 4,891,013 | 1/1990 | Komaki | 439/188 |
| 5,052,484 | 10/1991 | Gesta | 200/51.09 |
| 5,092,788 | 3/1992 | Pristupa | 439/225 |
| 5,114,359 | 5/1992 | Chishima | 439/489 |

FOREIGN PATENT DOCUMENTS

| | | | |
|---|---|---|---|
| 0050150 | 5/1911 | Austria | 200/51.09 |
| 0099574 | 11/1923 | Austria | 200/51.09 |

Primary Examiner—Joseph J. Hail, III
Assistant Examiner—James Miner
Attorney, Agent, or Firm—Andrew S. Fuller

[57] ABSTRACT

An electrical interface (210) for an electronic device (200) includes an integral connector portion (215). The connector portion (215) has protected connector contacts (220) which provide an electrical signal path to the internal circuitry of the device. The electrical interface (210) has a contact surface (112) disposed proximate to the connector portion (215) and interface contacts (117) electrically decoupled from the connector contacts (220). The contact surface (112) is responsive to a mechanical force, to electrically couple at least one of the interface contacts (117) to at least one of the connector contacts (220).

13 Claims, 4 Drawing Sheets

ELECTRICAL INTERFACE SEAL

This is a continuation of application Ser. No. 08/157,495 filed Nov. 26, 1993, and now abandoned.

TECHNICAL FIELD

This invention relates generally to electrical interfaces, and more particularly, to electrical interfaces for electronic devices.

BACKGROUND

Electrical interfaces are frequently included on an electronic device to support external accessories. The electrical interface provides access to the internal functions of the electronic device. For example, in a typical application, a two-way radio has an electrical interface in the form of an accessory connector port accessible through an opening within the radio housing. The connector port includes multiple electrical contacts which are externally accessible for mating with an accessory connector. Preferably, these contacts are protected from environmental contaminants, such as moisture, dust, corrosive fumes, and the like, which can affect the contacts to reduce performance of the interface, and in some cases cause an electrical short between contacts.

To protect the contacts, a typical prior art solution involves placing a removable protective cover over the interface However, removable covers tend to be inconvenient and are easily misplaced. As such, the cover is usually attached in some manner to the device housing to reduce the likelihood of misplacement. Both the cover and the attachment mechanism consume valuable space. This presents a problem for designers trying to achieve smaller product packages, as the cover usually represents unwanted bulk for the typical user.

Additionally, it is often desirable to prevent environmental contaminants from entering within the radio, or other electronic device, through the opening within the housing accommodating the interface. Such contaminants may adversely affect the internal components of the device, and thus, the overall performance of the device. Ordinarily, this problem is addressed by sealing the opening between the interface and the device housing.

A need exists for electrical interfaces, such as connector ports, which are sealed to protect against damage to the internal components of the electronic device. Moreover, electrical contacts must be protected from the environment, and must be protected from common problems such as an inadvertent electrical short. It is desirable that the interface protection scheme be unobtrusive, and yet provide convenient access to the electrical contacts on the electrical interface.

DETAILED DESCRIPTION OF THE PREFERRED EMBODIMENT

Generally, the present invention provides for a sealed electrical interface for an electrical or electronic device. The seal includes spaced apart electrical conductors disposed in a predetermined pattern along a contact surface. The electrical conductors provide electrical coupling between the contact surface of the electrical interface and protected contacts of the device connector. The electrical conductors are ordinarily electrically disengaged from the connector contacts when the electrical interface is not in use. Electrical coupling is provided by applying a force, typically by an external connector, to the contact surface of the seal such that the electrical conductors of the contact surface become electrically coupled to the contacts of the device connector. The result is an electrically permeable sealed interface which is less susceptible to problems caused by environmental contaminants, such as moisture and the like, but which allows quick access to the electrical interface.

Figure 1:
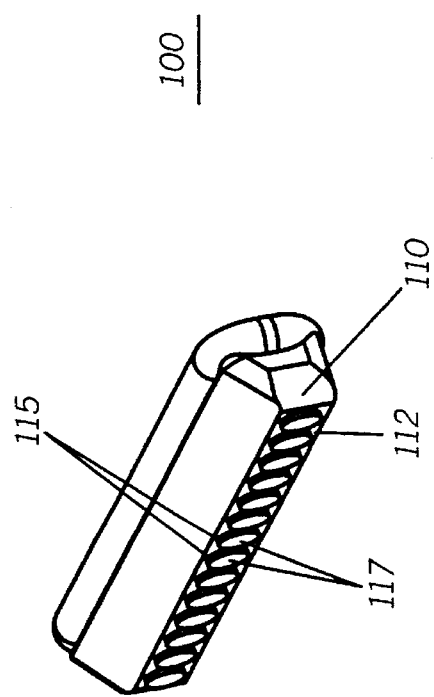
FIG. 1 is a perspective view of an electrical interface seal in accordance with the present invention.

The present invention can be more fully understood with reference to FIGS. 1, 2, 3, 4, and 5. FIG. 1 is a perspective view of an electrical interface seal 100 in accordance with the present invention. The seal 100 is formed from an electrically non-conductive base material, with electrical conductors 115 in the form of conductive pills, disposed within the base material. Preferably, the base material is resilient, flexible, and resistant to water, dust, and other environmental contaminants, and is able to withstand repeated engagement and disengagement without substantial damage. In the preferred embodiment, the base material comprises a relatively thin layer of silicone rubber which functions as an insulating material. Other suitable materials include, without limitation, urethane and polypropylene.

Figure 2:
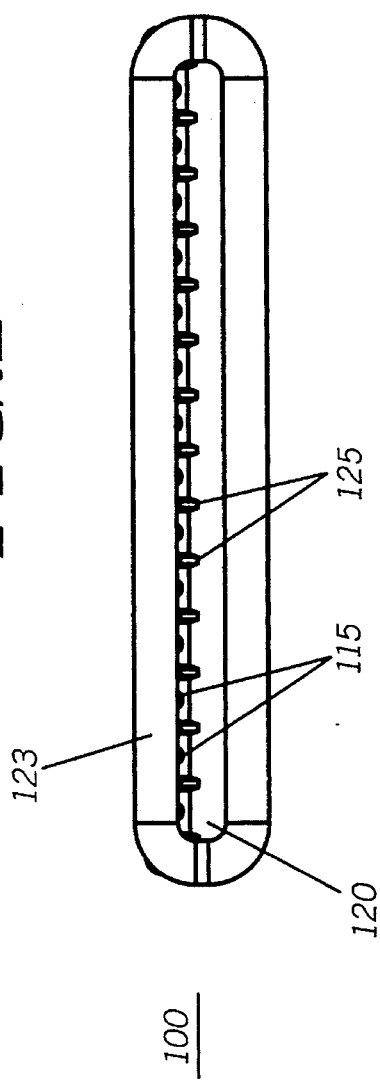
FIG. 2 is a perspective view of a second orientation of the seal of FIG. 1.

The seal 100 has a first ("outer") surface 110, which has a planar portion extending longitudinally along the seal 100, to form a contact surface 112. The electrical conductors 115 are insert molded metallic filled conductors, such as silicone impregnated with metal, which are capable of efficiently transmitting electrical signals. The electrical conductors 115 project from the contact surface 112 to form clearly demarcated electrical contacts, which function as the electrical interface contacts 117. FIG. 2 is a second perspective view of the seal 100, showing a second ("inner") surface 120. The electrical conductors 115 provide electrical conductivity from the first surface 110 to the second surface 120 of the seal 100. Web like spacers 125 project from the second surface 120 and are disposed between the electrical conductors 115 to maintain a proper spatial relationship among the electrical conductors 115. Additionally, the seal 100 has an integrally formed cylindrical shaped ring 123 extending along its periphery. The ring 123 is an integral compressible O-ring 123, and has sealing properties typical to common discrete O-rings. The operational aspects and specific use of the seal 100 will be described below.

Figure 3:
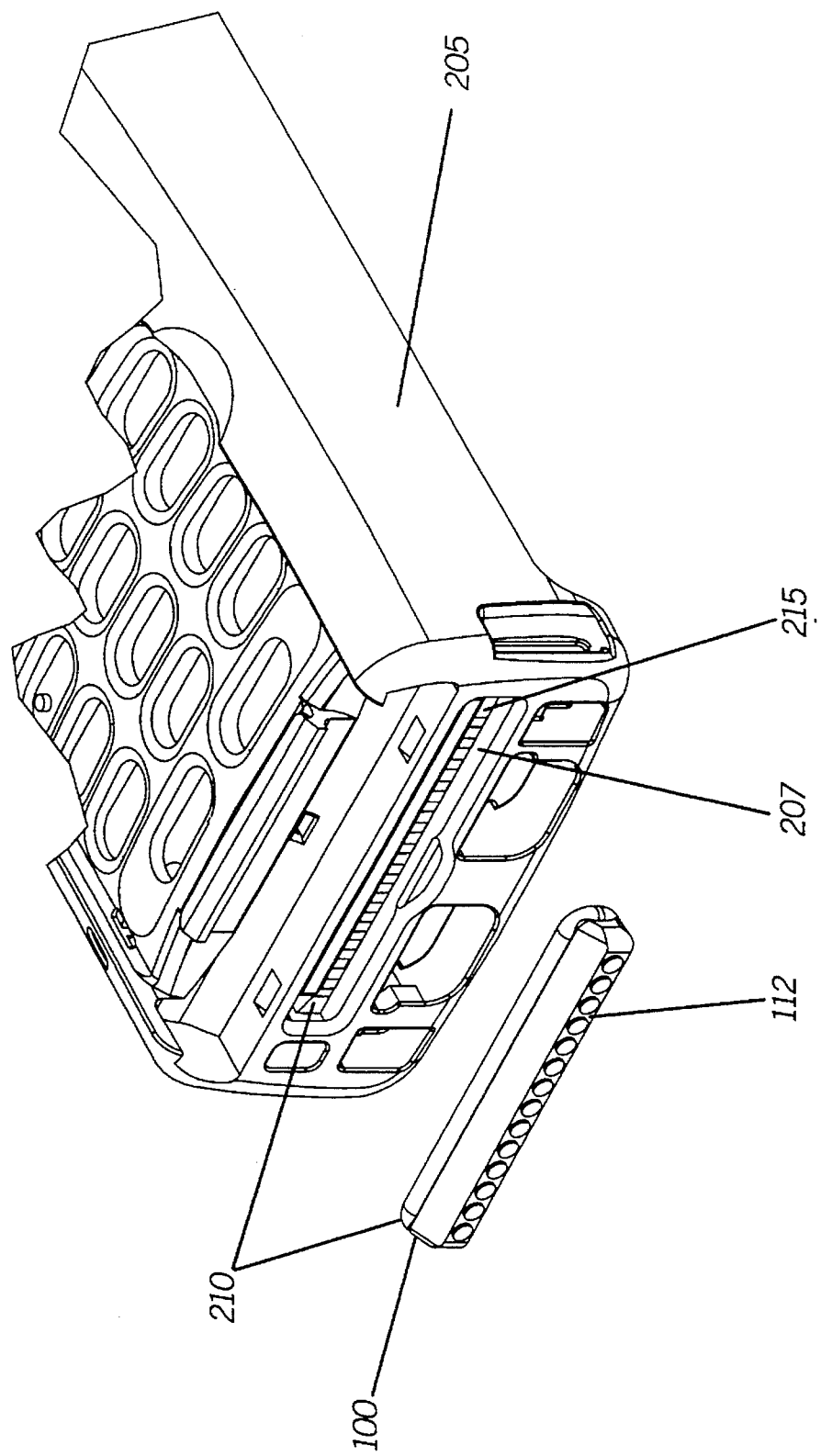
FIG. 3 is a fragmentary exploded perspective view of an electronic device having an electrical interface which incorporates the seal of FIG. 1, in accordance with the present invention.

FIG. 3 is a fragmentary exploded perspective view of an electronic device 200 having an electrical interface 210 which incorporates the seal 100, in accordance with the present invention. The electronic device 200 is a two-way portable radio, for communicating over a radio frequency channel. The radio 200 includes a radio housing 205, an electrical interface 210, including the seal 100, to support an accessory device. The radio housing 205 houses well-known communications circuitry and other internal components necessary for the operation of the two-way radio 200. The electrical interface 210 includes an accessory connector 215 portion and the seal 100, and is accessible through an opening 207 within the housing 205. The accessory connector 215 is electrically coupled to the internal electrical circuitry of the radio 200, and provides external access to the radio's internal functions. The seal 100 is formed to fit over the accessory connector 215 such that the contact surface 112 is disposed proximate to the accessory connector 215.

Figure 4:
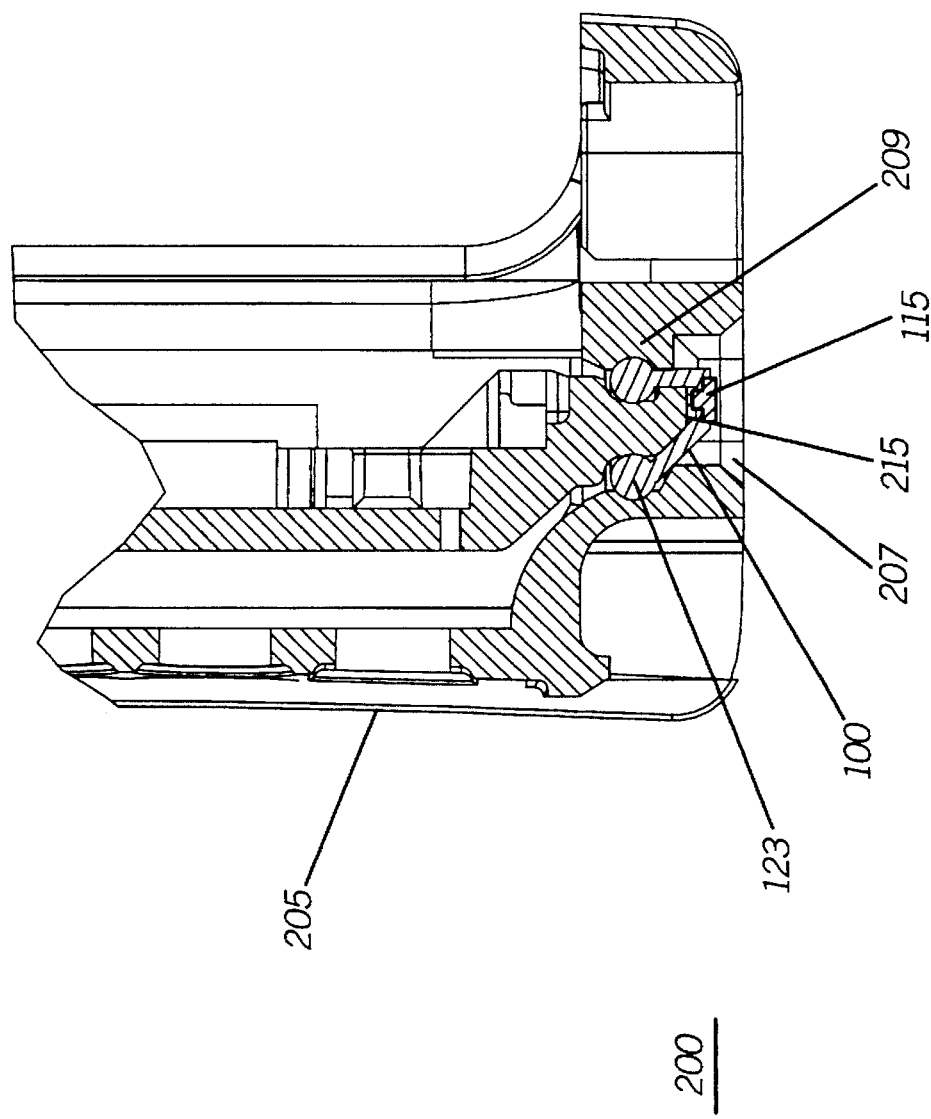
FIG. 4 is a fragmentary cross-sectional profile view of the electronic device of FIG. 3.

One function of the seal 100 is to protect the internal components of the radio 200. The seal 100 prevents environmental contaminants, such as water, dust, and the like, from entering the radio 200 through the opening 207 within the radio housing 205, which accommodates the accessory connector 215. Referring to FIG. 4, a fragmentary cross-sectional profile view of the electronic device 200 is shown. It can be seen that seal 100 is mounted over the accessory connector 215 and within the radio housing 205 such that the O-ring 123 portion of the seal 100 is disposed between the walls 209 of the opening 207 within the radio housing 205 and the accessory connector 215. This provides a tight seal which protects the internal components of the radio 200.

Figure 5:
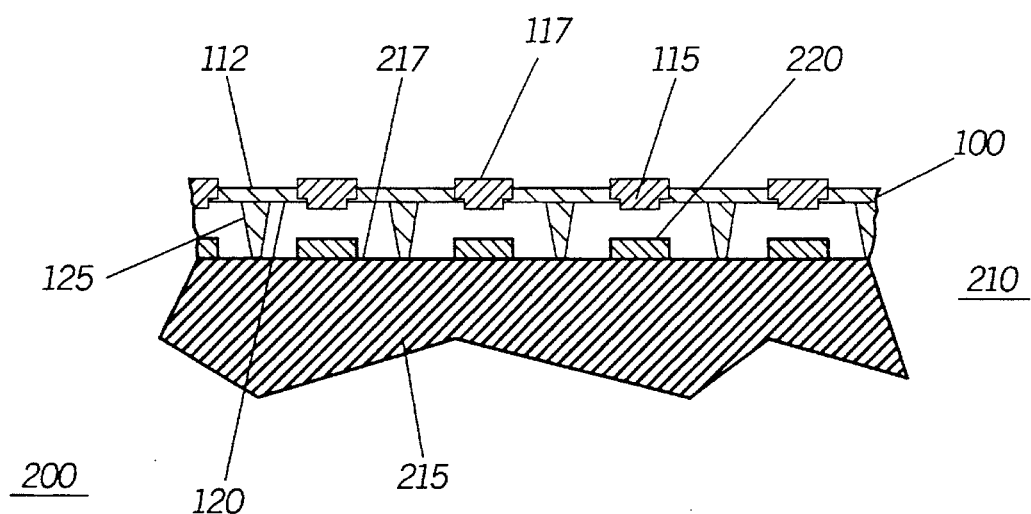
FIG. 5 is a fragmentary cross-sectional view of the electronic device of FIG. 3, highlighting the operational aspects of the seal.

Another function of the seal 100 is to protect the accessory connector 215, while providing for an accessible electrical interface. FIG. 5 is a fragmentary cross-sectional view of the radio 200, which depicts the interaction between the seal 100 and the accessory connector 215. The accessory connector 215 has a plurality of electrical conductors or contacts 220 ("connector contacts"), disposed along its surface. These connector contacts 220 are electrically coupled to the internal circuitry of the radio 200. The seal 100 is disposed about the accessory connector 215 such that the second surface 120 of the seal 100 engages the accessory connector 215, and such that at least some of the electrical conductors 115 of the seal 100 are aligned with at least some of the connector contacts 220 of the accessory connector 215. As indicated earlier, it is intended that the spacers 125 of the seal 100 prevent electrical coupling between adjacent electrical conductors 115. However, the spacers 125 also function to maintain a spatial relationship between the electrical conductors 115 and directly aligned connector contacts 220 when the electrical interface 210 is not in use, and function to prevent electrical coupling between electrical conductors 115 and non-aligned connector contacts 220 at all times. To accomplish this task, the spacers 125 are formed to project from the second surface 120 of the seal 100, and to engage the surface 217 of the accessory connector 215 between the connector contacts 220, so as to produce a spaced apart relationship between the electrical conductors 115 and the connector contacts 220.

Figure 6:
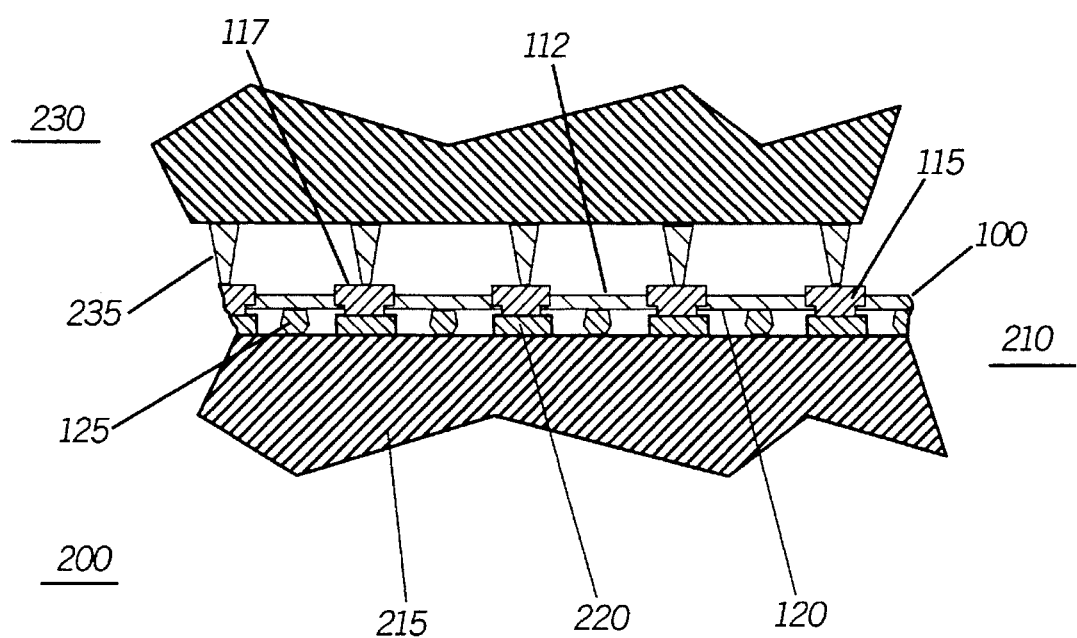
FIG. 6 is a fragmentary cross-sectional view of the electronic device of FIG. 3, with an engaging external connector.

In operation, the seal 100 is designed such that at least one of the electrical conductors 115 is electrically coupled to at least one of the connector contacts 220 or conductors of the accessory connector 215 in response to a mechanical force, such as that exerted by a connector, applied to the contact surface 112 of the seal 100. Thus, the contact surface 112 of the seal 100 forms the contact surface of the electrical interface 210, and is depressible such that when depressed, the electrical conductors 115, and thus the interface contacts 117, are electrically coupled to the connector contacts 220 of the accessory connector 215. Conversely, when the electrical interface 210 is not in use, the electrical conductors 115, and thus the interface contacts 117, are electrically isolated or decoupled from the accessory connector 215, and the circuitry of the radio 200. Consequently, when the electrical interface 210 is not in use, the likelihood of an inadvertent electrical short between the connector contacts 220 is substantially reduced. Ordinarily, there are no electrical signals present along the contact surface 112 of the seal 100 if there is no attached connector. FIG. 6 is a fragmentary cross-sectional view of the electrical interface with an attached or engaging external accessory connector 230. The attached connector 230 exerts the necessary force to cause the seal 100 to compress and cause contact between the electrical conductors 115 and the connector contacts 220, thereby presenting a conduit for electrical signals between connector pins 235 of the connector 230 and the accessory connector 215. In summary, the electrical interface contacts 117 of the contact surface 112 are selectively electrically decoupled from the connector contacts 220 of the accessory connector 215. This achieve significant advantages over prior art protection schemes for electrical interfaces. The connector contacts 220 of the accessory connector 215 are protected by the seal 100 from environmental contaminants, but convenient and quick access is provided to the accessory connector 215 when needed, without the use of space consuming covers, or other protection schemes.

It should be appreciated by one skilled in the art that the seal 100 of the present invention could assume a variety of shapes and configurations. Moreover, it is also contemplated that the conductive elements may be of various forms including being molded within the base material of the seal 100, or may comprise separate elements, among other configurations. A significant aspect of the invention is that a force applied to the contact surface of the electrical interface 210, such as to the contact surface 112 of the seal 100 in the preferred embodiment, causes the previously electrically isolated contact surface 112 to become electrically coupled to the internal circuitry of the radio 200.

The present invention offers significant advantages over prior art prior art electrical interfaces and corresponding interface protection schemes. In the preferred embodiment, the electrical interface seal 100 functions to protect both the accessory connector 215 and the internal components of the electronic device 200. The electrical interface 210 is enabled on demand by applying a force upon the contact surface 112 of the interface, as would occur by connecting an external connector. Space consumption is minimized, and convenience increased. The electronic device user does not have to be concerned with losing removable covers, or operating clumsy doors or latches, typically found in prior art protection schemes. Moreover, the seal 100 protects the permanent electrical contacts 220 of the underlying connector 215, and if the seal 100 is worn or damaged, it can be replaced relatively inexpensively. The seal 100 reduces the likelihood of electrical shorts, as would be caused by exposure of the electronic device 200 to water, and the like, because the seal 100 does not electrically engage the connector 215 when not in use. Thus, the electrical interface seal 100 is an unobtrusive and convenient solution for forming a protected electrical interface 210.

What is claimed is:

1. A seal for an electrical interface, the seal comprising:

a resilient insulating base material having a first surface, and a second surface that interfaces with the electrical interface;

a plurality of spaced apart conductive elements disposed within the insulating base material, the conductive elements forming electrical contacts on the first surface of the insulating base material and electrically coupling the first surface to the second surface;

wherein portions of the insulating base material project along the second surface to form a plurality of spacers that are compressible and resilient, the plurality of spacers maintaining a spaced apart relationship between the conductive elements and the electrical interface when the plurality of spacers is not compressed, and wherein at least one of said plurality of spacers is disposed between two of said plurality of spaced apart conductive elements.

2. The electrical interface seal of claim 1, wherein the conductive elements comprise silicone impregnated with metal.

3. The electrical interface as defined in claim 1, further comprising a peripheral compressible ring formed by an extending portion of the insulating base material.

4. An electrical interface for an electronic device, comprising:

a connector portion integral to the electronic device, the connector portion having a connector surface, and a plurality of connector contacts disposed along the connector surface;

a compressible electrical interface seal disposed about the connector portion and covering the connector contacts, the electrical interface seal comprising:

a compressible resilient base material having a first surface and a second surface, the first surface presenting a contact surface for the electrical interface, the base material extends to form a peripherally located compressible ring;

a plurality of electrical conductors disposed in a spaced apart relationship within the base material, and electrically coupling the first surface to the second surface; and at least one spacer integrally formed from a portion of the base material that projects from the second surface in between adjacent electrical conductors;

wherein the contact surface is responsive to a mechanical force applied thereto to electrically couple the plurality of electrical conductors to the plurality of connector contacts, and wherein the at least one spacer engages the connector surface to maintain a spaced apart relationship between the connector contacts and the electrical conductors when no mechanical force is applied to the contact surface.

5. The electrical interface as defined in claim 4, further comprising a plurality of spacers, each spacer being disposed between adjacent electrical conductors along the second surface of the base material.

6. The electrical interface as defined in claim 4, wherein each of the plurality of electrical conductors is aligned with a corresponding one of the plurality of connector contacts and the at least one spacer engages the connector surface between connector contacts to prevent electrical coupling between an electrical conductor and a nonaligned connector contact.

7. A radio, comprising:

a radio housing having communication circuitry therein; and an electrical interface housed by the radio housing, the electrical interface comprising:

a connector portion integral to the electronic device, the connector portion having a connector surface, and a plurality of connector contacts disposed along the connector surface;

a compressible electrical interface seal [disposed] fitted on the connector portion and covering the connector contacts, the electrical interface seal comprising:

a base material having a first surface and a second surface, the first surface presenting a contact surface for the electrical interface;

a plurality of electrical conductors disposed in a spaced apart relationship within the base material, and electrically coupling the first surface to the second surface; and at least one spacer integrally formed from a portion of the base material that projects from the second surface in between adjacent electrical conductors; and a compressible ring formed from an extension of the base material along the periphery of the seal;

wherein:

the compressible ring seals a portion of the radio housing; and the contact surface is responsive to a mechanical force applied thereto to electrically couple the plurality of electrical conductors to the plurality of connector contacts, and wherein the at least one spacer engages the connector surface to maintain a spaced apart relationship between the connector contacts and the electrical conductors when no mechanical force is applied to the contact surface.

8. The electrical interface as defined in claim 7, further comprising a plurality of spacers, each spacer being disposed between adjacent electrical conductors along the second surface of the base material.

9. The electrical interface as defined in claim 7, wherein each of the plurality of electrical conductors is aligned with a corresponding one of the plurality of connector contacts and the at least one spacer engages the connector surface between connector contacts to prevent electrical coupling between an electrical conductor and a non-aligned connector contact.

10. A radio, comprising:

a radio housing having communication circuitry therein; and an electrical interface housed by the radio housing, the electrical interface comprising:

a connector portion integral to the electronic device, the connector portion having a connector surface, and a plurality of connector contacts disposed along the connector surface;

a compressible electrical interface seal fitted over the connector portion and covering the connector contacts, the electrical interface seal comprising:

a base material having a first surface and a second surface, the first surface presenting a contact surface for the electrical interface;

a plurality of electrical conductors disposed in a spaced apart relationship within the base material, and electrically coupling the first surface to the second surface; and a plurality of spacers formed from projections of the base material along the second surface, each of the plurality of spacers being disposed between two of the plurality of electrical conductors;

a compressible seal integrally formed from an extension of the base material;

wherein the contact surface is responsive to a mechanical force applied thereto to electrically couple the plurality of electrical conductors to the plurality of connector contacts, and wherein the at least one spacer engages the connector surface to maintain a spaced apart relationship between the connector contacts and the electrical conductors when no mechanical force is applied to the contact surface;

wherein each of the plurality of electrical conductors is aligned with a corresponding one of the plurality of connector contacts and each of the plurality of spacers engages the connector surface between connector contacts to prevent electrical coupling between an electrical conductor and a non-aligned connector contact.

11. A seal for an electrical interface, the seal comprising:

a resilient insulating base material having a first surface, and a second surface that interfaces with the electrical interface;

a plurality of spaced apart conductive elements disposed within the insulating base material, the conductive elements forming electrical contacts for interfacing to the electrical interface, and electrically coupling the first surface to the second surface, the conductive elements being spatially separated from the electrical interface by the resilient insulating base material; and a peripheral compressible ring integrally formed from an extension of a portion of the insulating base material.

12. The seal of claim 11, further comprising a plurality of spacers integrally formed from the resilient insulating base material and projecting from the second surface, wherein at least one of said plurality of spacers is disposed between two of said plurality of spaced apart conductive elements.

13. An electrical interface for an electronic device, comprising:

a connector portion integral to the electronic device, the connector portion having a connector surface, and a plurality of connector contacts disposed along the connector surface;

a compressible electrical interface seal disposed about the connector portion and covering the connector contacts, the electrical interface seal comprising:

a compressible resilient base material having a first surface and a second surface, the first surface presenting a contact surface for the electrical interface;

a plurality of electrical conductors disposed in a spaced apart relationship within the base material, and electrically coupling the first surface to the second surface; and at least one spacer integrally formed from a portion of the base material that projects from the second surface in between adjacent electrical conductors;

wherein the contact surface is responsive to a mechanical force applied thereto to electrically couple the plurality of electrical conductors to the plurality of connector contacts, and wherein the at least one spacer engages the connector surface to maintain a spaced apart relationship between the connector contacts and the electrical conductors when no mechanical force is applied to the contact surface.

* * * * *